(12) United States Patent
Header et al.

(10) Patent No.: US 7,866,588 B2
(45) Date of Patent: Jan. 11, 2011

(54) METHOD FOR MANUFACTURE OF A FISHING REEL

(75) Inventors: Gregory A. Header, Richland, PA (US); Timothy A. Wiest, Hegins, PA (US)

(73) Assignee: Innovative Reel Technologies Ltd., Pine Grove, PA (US)

( * ) Notice: Subject to any disclaimer, the term of this patent is extended or adjusted under 35 U.S.C. 154(b) by 526 days.

(21) Appl. No.: 11/642,947

(22) Filed: Dec. 21, 2006

(65) Prior Publication Data

US 2008/0149752 A1    Jun. 26, 2008

(51) Int. Cl.
*A01K 89/01*    (2006.01)
(52) U.S. Cl. ........................... 242/311; 242/316
(58) Field of Classification Search ........... 242/310, 242/311, 312, 323, 316
See application file for complete search history.

(56) References Cited

U.S. PATENT DOCUMENTS

| | | | |
|---|---|---|---|
| 5,487,445 A * | 1/1996 | Biehl | 182/181.1 |
| 5,647,650 A * | 7/1997 | Daugherty et al. | 312/265.1 |
| 5,897,069 A | 4/1999 | Brown et al. | |
| 5,899,398 A | 5/1999 | Henriksson et al. | |
| 5,915,803 A * | 6/1999 | Daugherty et al. | 312/263 |
| 7,290,569 B2 * | 11/2007 | Gesing | 139/91 |
| 2005/0109417 A1 * | 5/2005 | Gesing | 139/55.1 |
| 2005/0126246 A1 * | 6/2005 | Ungurean | 72/254 |

* cited by examiner

*Primary Examiner*—Emmanuel M Marcelo
(74) *Attorney, Agent, or Firm*—Shlesinger Arkwright & Garvey LLP (57) ABSTRACT

This invention is a method for manufacturing a spinning reel from an extrusion and in particular the frame or housing of a spinning reel, the method comprises the steps of providing a single long bar single extrusion, the extrusion includes two regions, a first region comprises a hollow, tube-like portion and a second region comprises a filled portion, the filled portion extending exterior of the hollow portion and transverse to the longitudinal axis of the second region, cutting a blank from the end of the extrusion to form a blank and machining the blank to provide a frame or housing of a spinning reel. The invention is also directed to a spinning reel frame formed by an extrusion.

17 Claims, 7 Drawing Sheets

METHOD FOR MANUFACTURE OF A FISHING REEL

FIELD OF THE INVENTION

This invention relates to fishing reels and in particular, a method for manufacturing an open faced spinning reel.

BACKGROUND OF THE INVENTION

Spinning fishing reel are known in the art. Open faced spinning reels position an unenclosed line spool beneath the handle of the rod and in a direction parallel to the direction of the fishing rod. The housing or frame of the spinning reel is provided with a leg member for securing the reel to a fishing rod. A lure attached to the line may be cast with minimal drag as it is deployed from the spool. A mechanical line pick up in the form of a wire bail is provided to retrieve the line and reload it back onto the spool. An anti-reverse lever is provided to prevent the crank handle from rotating while a fish is pulling the line from the spool.

Frames for spinning reels are typically manufactured from aluminum or another metal. One prior art manufacturing method includes die casting a liquid aluminum metal within a mould. Another method comprises forging an aluminum metal into the various reel components. Yet another method involves machining the components from a solid block of aluminum material. Each of these methods has inherent disadvantages. Die casting produces a lower quality product due to porosity and impurities formed in metal components. Forging requires high tooling costs and machining is labor intensive and uneconomical. Machining from a solid block of aluminum material does result in high quality reel components. However, it is very time consuming, requires expensive machinery and therefore, is uneconomical.

It is known to form a frame for a bait casting or fly fishing reel from a length of a hollow tubular extrusion. The interior wall of the extrusion is milled radially and large sections are removed to create openings around the circumference of the frame. It is also known to form a bait casting or fly fishing frame from a length of walled extrusion. The extrusion likewise requires extensive milling to create a finished frame. Each of these prior art manufacturing processes is uneconomical and labor intensive as extensive post-extrusion machining is required. Furthermore, neither prior art process is adapted for manufacture a spinning reel frame which by definition will include an integral leg member.

BRIEF SUMMARY OF THE INVENTION

The invention is a spinning reel frame formed from a transverse section that is cut from a single length of an aluminum or other metal extrusion, the extrusion includes a first region in the form of a hollow extrusion and a second region in the form of a filled extrusion, the filled extrusion is integral with and extends exterior of the wall forming the hollow extrusion to provide a leg member for supporting the frame.

The invention is also directed to a method for forming a spinning reel frame, the method comprises the steps of providing a length of a metal extrusion, the extrusion having a hollow interior region formed by a circumferential side wall, said circumferential side wall having a filled region extending exteriorly therefrom and integral therewith to provide a reel leg member and cutting the extrusion in a manner transverse to the length of the extrusion to provide a blank that is adapted for further machining into a spinning reel frame.

DETAILED DESCRIPTION OF THE INVENTION

Figure 1:
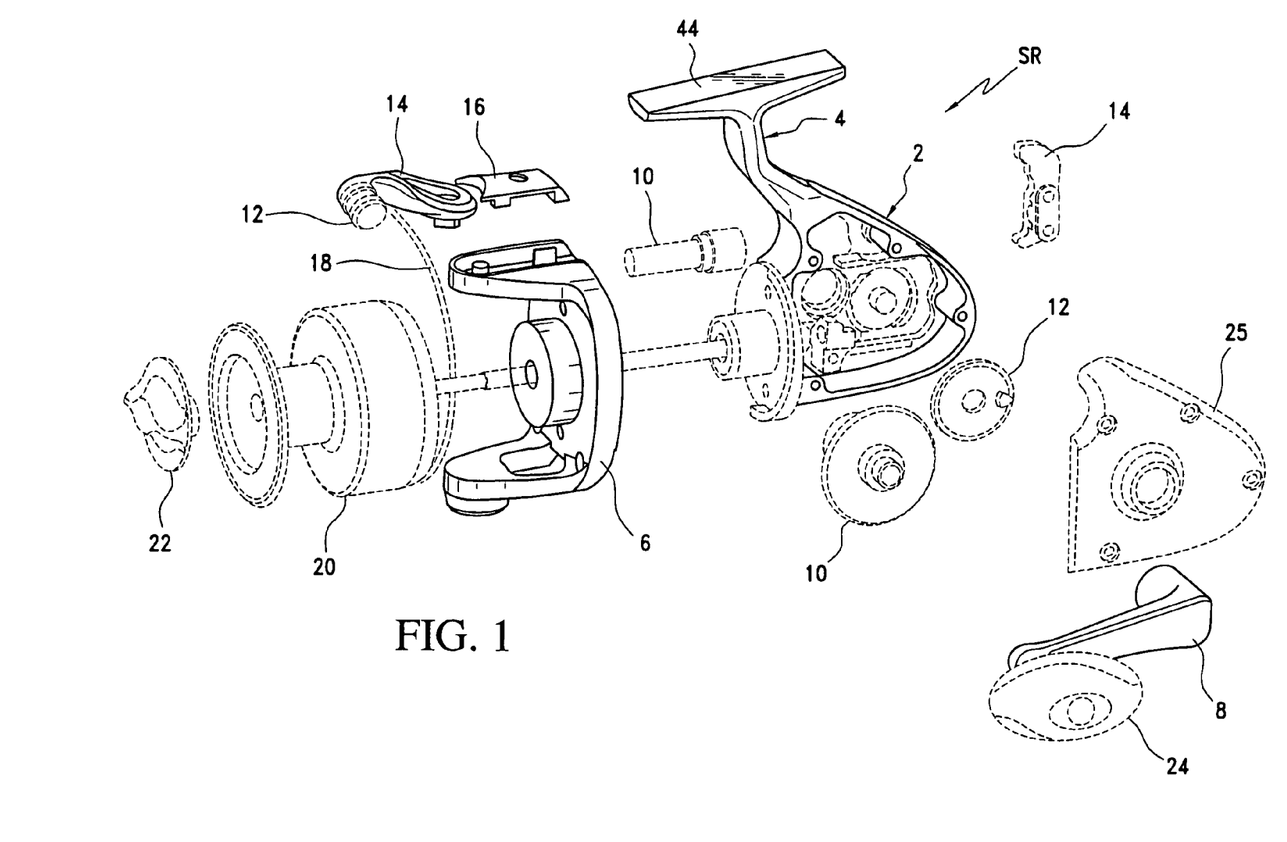
FIG. 1 is an exploded perspective view of an open faced fishing reel according the present invention with portions of the reel shown in phantom lines.

An open faced spinning reel SR manufactured according to the method of the present invention is shown in FIG. 1. The spinning reel SR comprises a frame or housing 2 including a leg member 4, a rotor assembly 6, handle 8, a bail assembly 12 including rotor arm 14 and rotor cover 16.

As will be apparent to persons of skill in the fishing reel art, the spinning reel SR is provided with conventional mechanical gears in the form of a main gear 10, cooperating crosswind gear 12 and crosswind block 14 all of which are shown in phantom lines. In addition, a pinion 10, bail arm 18, spool 20 and drag knob 22 are provided and all of which operate in the known manner. Handle 8 is provided with a turning knob 24. In addition, a pair of side plates 25 (only one shown) operatively associated with the frame 2 are also provided.

Figures 2, 3:
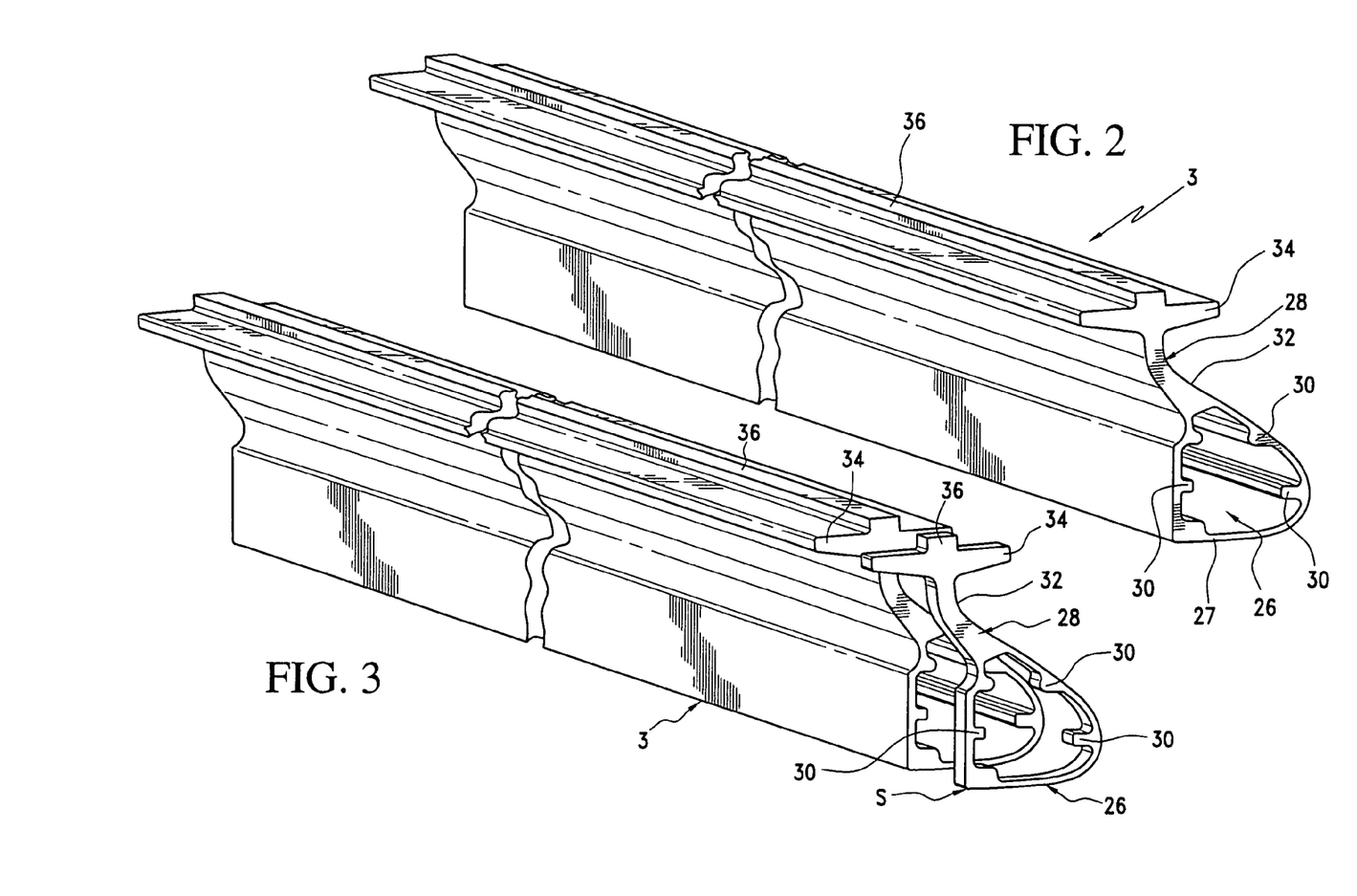
FIG. 2 is a perspective view of an uncut length of an extrusion for the spinning reel frame according to the present invention.
FIG. 3 is perspective view of a length of an extrusion as shown in FIG. 2 with a cut section forming a spinning reel frame according to the present invention.

Turning to FIG. 2, an elongated aluminum or other metal extrusion 3 of unidirectional grain structure for manufacturing a spinning reel frame 2 according the present invention is shown. Extrusion 3 is a unitary extruded member of variable length depending upon the number of frames 2 to be produced. Extrusion 3 is preferably a long extruded bar stock form by an aluminum mill extrusion process using a platen and die mandrel extrusion machine. Because portion 26 of the extrusion is hollow and portion 28 is filled (FIG. 2) there is a transition during extrusion from the thin wall forming the hollow portion 26 to the relatively thicker wall forming the filled portion 28. This transition is effectively controlled by limiting the tongue ratio during extrusion and which in the preferred embodiment is 2:1 tongue ratio. Both portions are formed form a single extruded wall to provide an integral reel leg 4 which extends transverse to the central axis of the hollow portion 26.

Figure 4:
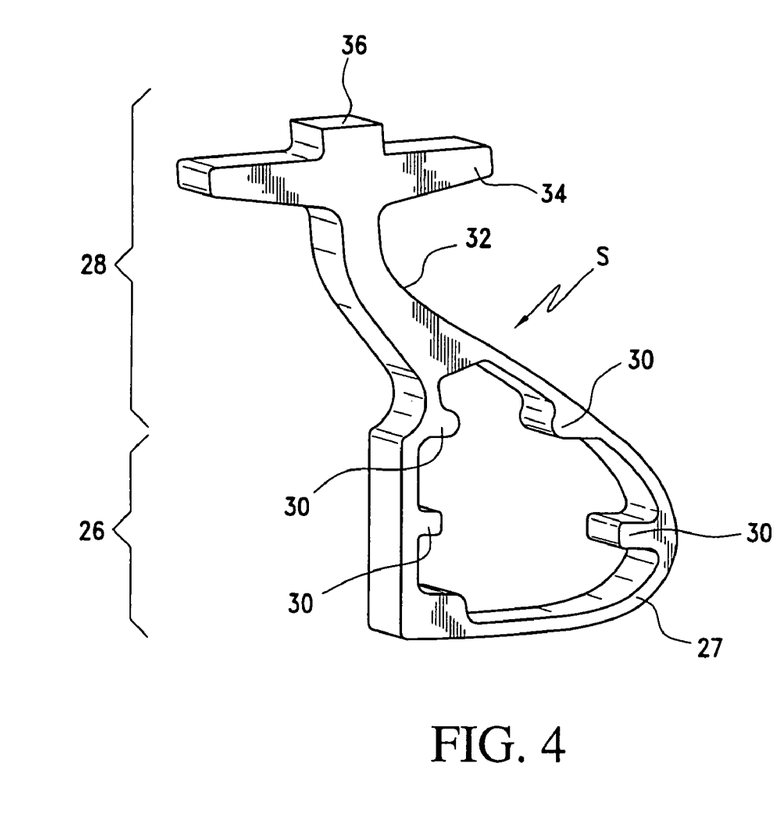
FIG. 4 is a perspective view of the cut section shown in FIG. 3.

Aluminum extrusion 3 is a unitary extrusion having two sections or regions. The first is a tube-like portion 26 formed by wall member 27 and defining an interior space extending the length of the extrusion 3. The second region is shown to be a generally T-shaped portion 28 that extends from the wall member 27 of portion 26 and in a direction transverse to the longitudinal axis of the extrusion 3. First region 26 and second region 28 of the extrusion 3 are also shown in FIG. 3 and which further illustrates a pre-machined transverse slice S taken has been removed from the extrusion 3. FIG. 4 is an enlarged view of the pre-machined transverse slice S separated from extrusion 3.

As best seen in FIGS. 2 and 3, the interior surface of wall 27 that defines first region 26 include several raised abutments 30 that are drilled during the machining step as will be further explained below.

Second region 28 extends radially from the exterior surface of wall 27 and transverse to the longitudinal axis of extrusion 3. As can be seen in FIGS. 2 and 3, region 28 of extrusion 3 is a generally T-shaped. FIG. 4 illustrates the T-shaped region 28 in greater detail and in particular as shown in connection with a pre-machined transverse slice S. T-shaped region 28 includes a neck portion 32 having a cross member 34 and lug portion 36.

The pre-machined transverse slice S shown in FIGS. 3 and 4 is cut from the extrusion 3 to provide a blank that may then be further machined to form the housing or frame 2 shown in FIG. 1. The slice S is preferably cut to a width of about 1/16 of an inch wider than the width of the finished frame 3 once it has been machined. As is apparent, no additional tooling will be required if a frame 2 of increased width is desired.

Figure 5:
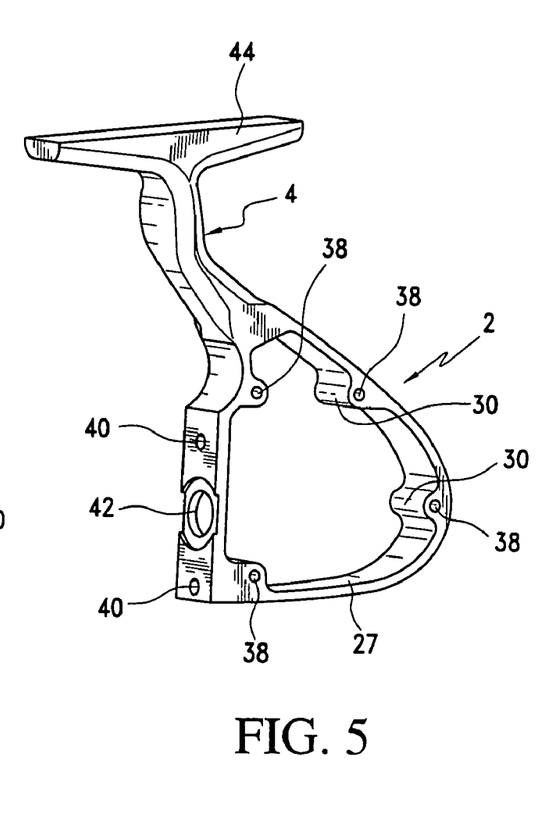
FIG. 5 is a perspective view of the cut section shown in FIG. 4 after screw holes have been drilled into the cut section and showing milled edges of the leg member.

FIG. 5 illustrates slice or blank S of FIGS. 3 and 4 after it has been machined into the finished frame 2. The lug portion 36 of slice S is clamped so that it may be held during machining. A series of screw holes are drilled into the raised abutments 30 for securing side plates 25 (FIG. 1) to the housing. No machining of the interior of the frame is required. In addition, screw holes 40 are provided through the forward portion of wall 27 for securing the rotor (now shown) to the housing 2. A passageway 42 is also provided through the forward section of wall 27 through which the axle (not shown) for supporting the spool extends. The exterior of the T shaped region 28 is machined into a reel leg 4. The corner edges of the neck portion 32 and cross section 34 are also machined to remove relatively minor amounts of metal and to achieve a smooth finish. Lug 36 is completely machined off of the leg 4 so that a foot portion 44 is provided on the end of the leg 4. The foot 44 is adapted to allow the spinning reel SR to be secured to a fishing rod (not shown).

The present invention enables highly efficient and precise machining that is conducted in only two stages. The first stage provides the screw holes to the first section 26 whereas the second stage finishes the exterior of region 28 to provide the finished reel leg 4. The method according to the present invention also provide an aluminum spinning reel frame 2 having a unidirectional grain structure of low porosity and a bright anodized finish. In addition, the post-extrusion machining steps are minimal and require only small amounts of metal be removed from the exterior surfaces of the frame 2. Only 0.050 inch thickness of material need be machined or otherwise removed from the exterior surface of slice or blank S thereby resulting in substantial labor and material savings.

In an alternative embodiment of the present invention, the handle 8, rotor 6, rotor cover 16 and rotor arm 14 may also be extruded, sliced into an individual section and machined into a finished component suitable for assembly into the spinning reel SR. These embodiments are shown in the remaining figures.

Figures 6, 7:
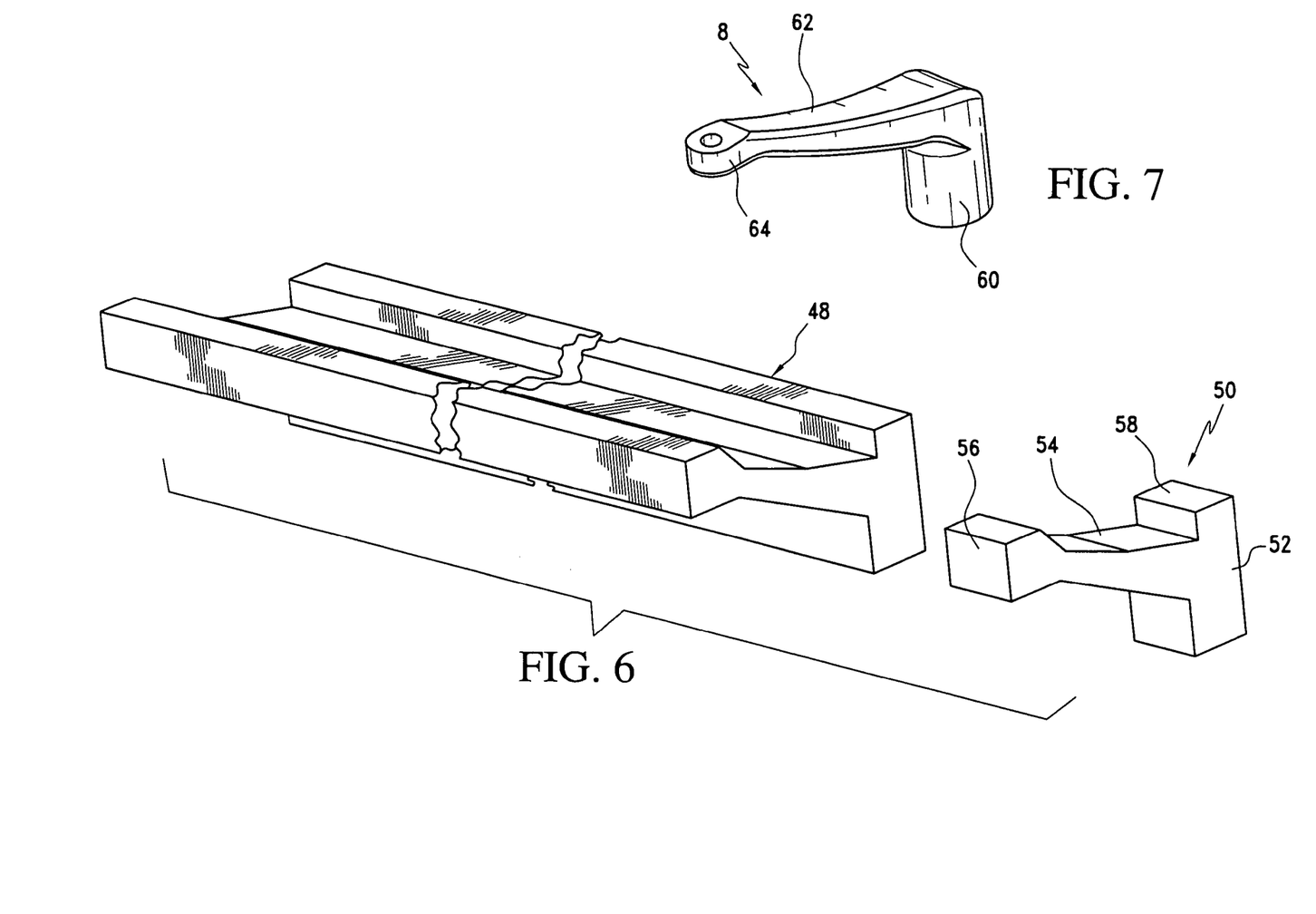
FIG. 6 is a perspective view of a length of an extrusion according to the present invention and showing a cut section for forming the spinning reel handle.
FIG. 7 is the cut section shown in FIG. 6 with the exterior surfaces of the handle milled.

FIG. 6 shows a length of a solid extrusion 48 having a generally L-shaped configuration. A blank 50 is sliced from the extrusion 48 and consists of a base 52, having a elongated mid-section 54 that terminates at region 56. A lug member 58 is provided so that the section can be secured during final machining of the exterior surfaces.

FIG. 7 illustrates a finished handle 8 that has been machined from blank 50. The handle includes a first end portion 60 adapted to fixedly receive a shaft for connection to gear 12 (not shown), a mid-section 62 that terminates at end section 64. The end section 64 includes a recess for connection of a knob 24 (not shown).

Figures 8, 9:
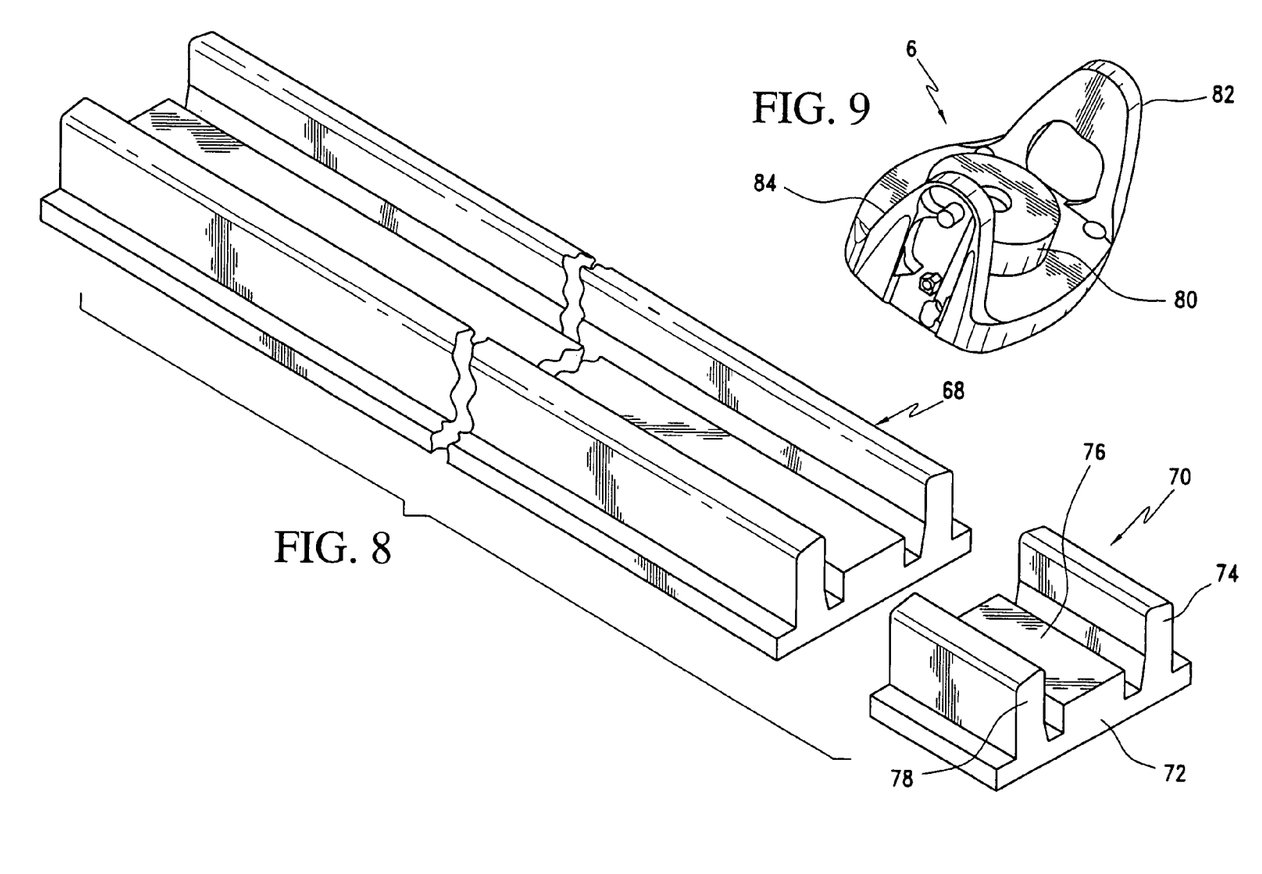
FIG. 8 is a perspective view of a length of an extrusion according to the present invention and showing a cut section for forming the spinning reel rotor.
FIG. 9 is the cut section shown in FIG. 8 with the exterior surfaces of the rotor milled.

FIG. 8 shows a length of a solid extrusion 68 having a generally U-shaped configuration. A blank 70 of an appropriate width is sliced or otherwise removed from extrusion 68 and consists of a base 72 having raised sections 74, 76 and 78.

FIG. 9 illustrates a finished rotor 6 that has been machined from blank 70. The rotor 6 a central portion 60 adapted to receive a spool (not shown) and which has been machined from raised section 76. On either side of raised section 80 are flange portions 82 and 84, one of which is adapted to receive the rotor arm 14 (not shown) and rotor cover 16 (not shown). Flange portions 82 and 84 are machined from raised sections 74 and 78 respectively.

Figures 10, 11:
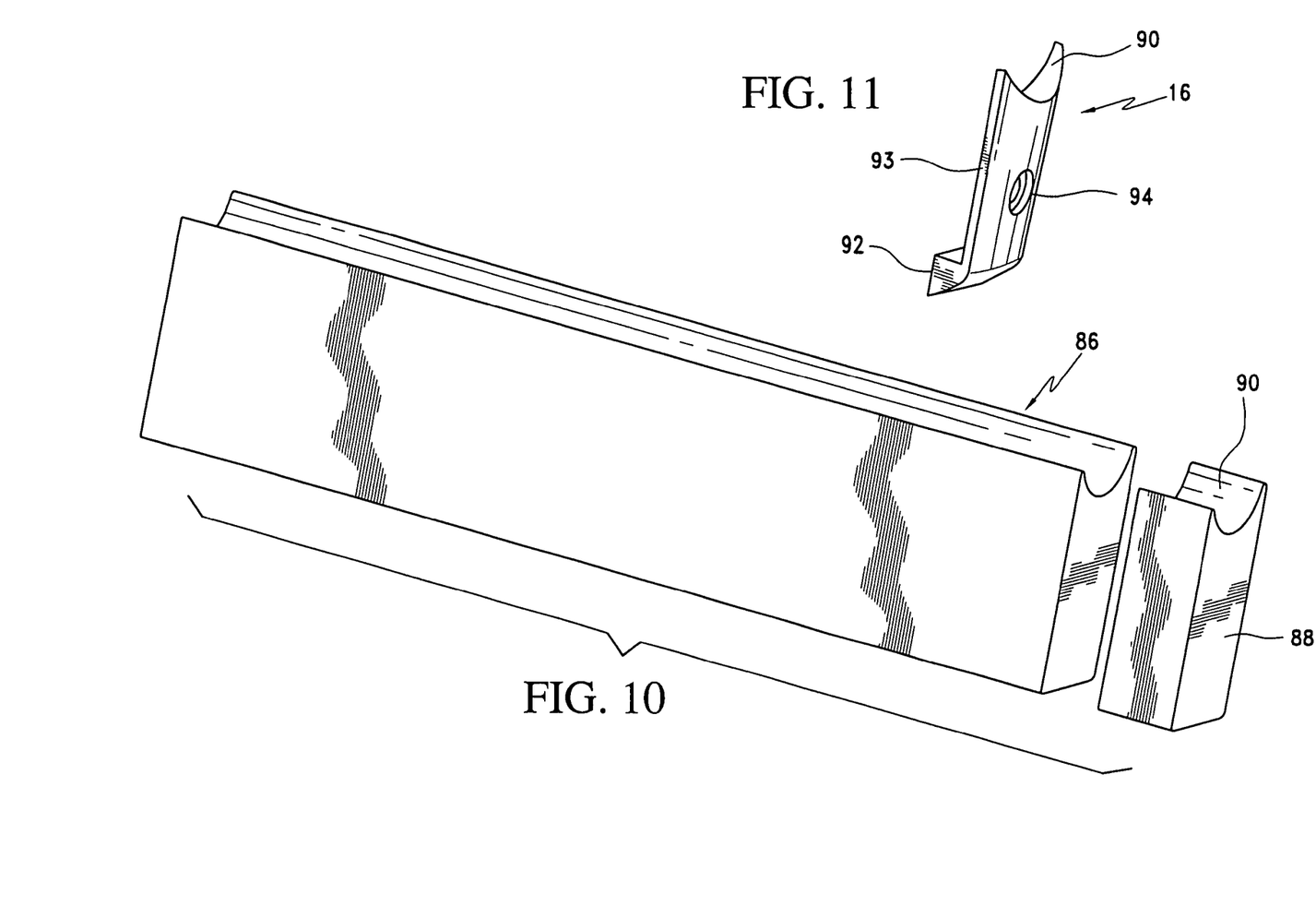
FIG. 10 is a perspective view of a length of an extrusion according to the present invention and showing a cut section for forming the spinning reel rotor cover.
FIG. 11 is the cut section shown in FIG. 10 with the exterior surfaces of the rotor cover milled.

FIG. 10 shows a length of a solid extrusion 86 having a generally rectangular configuration in cross section. A blank 88 of an appropriate width is sliced or otherwise removed from extrusion 86 and includes a convex end portion 90.

FIG. 11 illustrates a finished rotor cover 16 that has been machined from blank 88. The rotor cover 16 is provided with a convex end portion 90 at one end and a abutment portion 92 at an opposite end thereof. A passageway 94 is provided though the main body portion 93 of the cover 16.

Figures 12, 13:
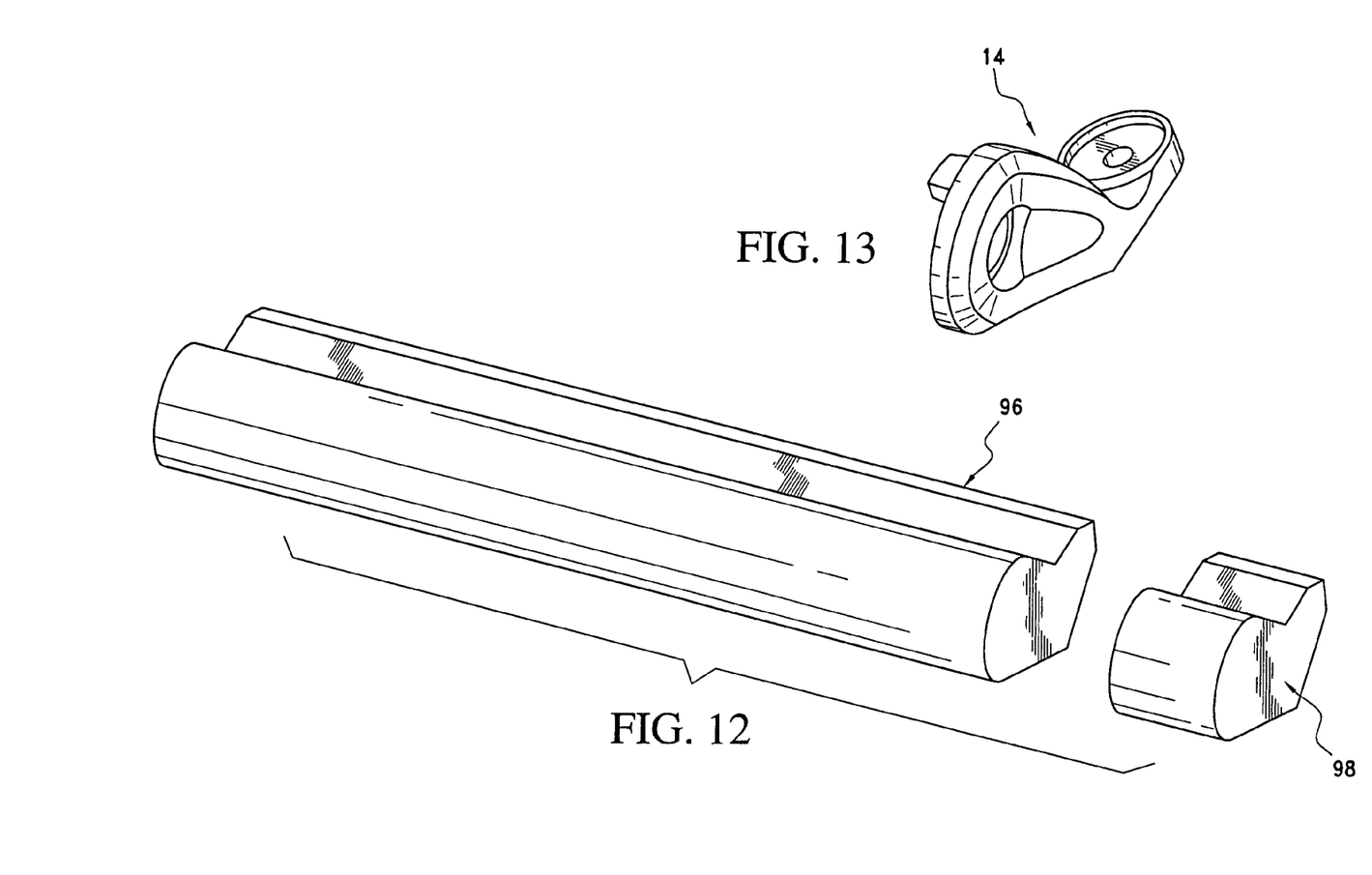
FIG. 12 is a perspective view of a length of an extrusion according to the present invention and showing a cut section for forming the spinning reel rotor arm.
FIG. 13 is the cut section shown in FIG. 12 with the exterior surfaces of the rotor arm milled.

FIG. 12 shows a length of a solid extrusion 96. A blank 98 of an appropriate width is sliced or otherwise removed from extrusion 96. A finished rotor arm 14 is shown in FIG. 13. The rotor arm is adapted to be secured to a bail wire (not shown).

Although this invention has been described above as having a preferred design, it is capable of further modifications, uses and adaptations that follow the general principles of the invention including departures from the above description that are known or a customary practice in the relevant art, provided the modifications and variations fall within the scope of the following claims or their equivalents.

We claim:

1. A method for producing a spinning reel frame, the method comprising the steps of:
   a) providing a long bar extrusion of a metal, the extrusion including a hollow, tube-shaped portion that extends coaxial with the longitudinal axis of the extrusion and a filled portion unitary therewith and having a generally T-shaped configuration, the filled portion extends exterior of the hollow portion and in a direction generally transverse to the longitudinal axis of the extrusion and comprises a cross member and a neck member, the neck member extends from the tube-shaped portion to the cross member, the cross member extends generally transverse to the longitudinal axis of the neck member;
   b) cutting a blank from an end of the long bar extrusion, the cut blank having a length corresponding to the width of the spinning reel frame;

c) machining at least the exterior surface of the filled portion to provide spinning reel frame having an integral leg adapted for connection to a fishing reel rod.

2. The method of claim 1 and wherein the long bar extrusion is an aluminum metal having a unidirectional grain structure.

3. The method of claim 1 and wherein the interior of the hollow portion includes at least one rib member extending the length thereof.

4. The method of claim 1 and wherein the cut blank includes at least one abutment extending interior of the hollow, tube-shaped portion.

5. The method of claim 4 and further including the step of:
   a) drilling a screw hole into the at least one abutment.

6. The method of claim 1 and wherein about 0.050 inch of material is machined from the exterior of the blank.

7. The method of claim 1 and wherein the filled portion includes a lug for fixedly securing the blank during machining.

8. The method of claim 1 and wherein the hollow, tube-shaped portion is co-extruded with the filled portion.

9. The method of claim 1 and wherein the hollow tube-shaped portion includes a generally circumferential wall, the filled portion is integral with the wall.

10. A spinning type fishing reel frame, said frame comprising:
    a) a blank cut from a length of a long bar aluminum extrusion, the cut extending transverse to the longitudinal axis of said extrusion, said blank having a hollow, tube-shaped portion formed from a circumferential wall member and a filled portion integral therewith, said tube shaped portion and said filled portion have the same width, said filled portion having a generally T-shaped configuration and extending exterior of said tube-shaped portion and comprises a cross member and a neck member, said neck member extends from said tube-shaped portion to said cross member, said cross member extends generally transverse to the longitudinal axis of said neck member to provide a leg member for supporting said frame on a fishing rod.

11. The frame of claim 10 and wherein said tube-shaped portion includes at least one abutment extending interior thereof and having a width the same as said circumferential wall member.

12. The frame of claim 11 and further comprising additional abutments extending interior of said circumferential wall member, all of said abutments are drilled to form screw holes therein.

13. The frame of claim 10 and wherein the hollow, tube-shaped portion is co-extruded with the filled portion.

14. The frame of claim 10 and wherein said filled portion is integral with said circumferential wall member.

15. The frame of claim 10 and wherein said blank is formed from aluminum material having a unidirectional grain structure and an anodized surface.

16. The frame of claim 10 and further comprising drilled structures and machined surfaces on at least one of said circumferential wall member and said filled portion.

17. A method for producing a spinning reel frame, the method comprising the steps of:
    a) providing a long bar extrusion of a metal, the extrusion including a hollow, tube-shaped portion that extends coaxial with the longitudinal axis of the extrusion and a filled portion unitary therewith and having a generally T-shaped configuration, the filled portion extends exterior of the hollow portion and in a direction generally transverse to the longitudinal axis of the extrusion and wherein the interior of the hollow portion includes at least one rib member extending the length thereof;
    b) cutting a blank from an end of the long bar extrusion, the cut blank having a length corresponding to the width of the spinning reel frame;
    c) machining at least the exterior surface of the filled portion to provide spinning reel frame having an integral leg adapted for connection to a fishing reel rod.

\* \* \* \* \*